Patented Sept. 16, 1924.

1,508,736

UNITED STATES PATENT OFFICE.

JOHN HENRY WEST, OF BAYSWATER, LONDON, AND ARTHUR JAQUES, OF WATERLOO, NEAR LIVERPOOL, ENGLAND.

PROCESS FOR THE PRODUCTION OF AMMONIUM COMPOUNDS.

No Drawing.    Application filed February 1, 1924.  Serial No. 690,076.

*To all whom it may concern:*

Be it known that we, JOHN HENRY WEST and ARTHUR JAQUES, both subjects of the King of Great Britain, residing, respectively, at Bayswater, in the county of London, England, and Waterloo, near Liverpool, in the county of Lancaster, England, have invented certain new and useful Improvements in Processes for the Production of Ammonium Compounds, of which the following is a specification.

This invention relates to the manufacture of ammonium compounds and has particular reference to obtaining ammonium salts in the solid state and in especial ammonium sulphite or ammonium sulphate or mixtures thereof directly from ammonia and sulphur dioxide, thus obviating the use of sulphuric acid for the absorption of the ammonia, as also the production of liquids which require evaporation or subjection to crystallization in order to obtain the ammonium sulphate in a solid form. The process is specially applicable to the utilization of synthetic ammonia and by-product ammonia recovered from gasworks, coke ovens, gas producers, and the like.

According to the present invention a process for the production of ammonium salts consisting mainly of ammonium sulphate and some ammonium sulphite consists in introducing ammonia and water vapour, or ammonia water vapour and liquid water in a fine state of division, into a gaseous mixture comprising sulphur dioxide and air, the relative proportions of the various aforementioned substances employed being such that (a) the concentration of the sulphur dioxide does not exceed about 4.2 per cent of the whole volume of the gases (b) the ammonia is present in such quantity that the reaction mixture is either neutral or slightly alkaline and (c) the amount of water vapour employed is sufficient to render the ammonium sulphite which is initially produced as a result of the reaction sensitive to rapid oxidation but is insufficient to make it sensibly wet after cooling the reaction products, whereby the said reaction products are obtained after cooling the mixture in a solid and substantially dry state and in a sensitive condition which permits of the rapid oxidation of a large proportion of the ammonium sulphite contained therein to ammonium sulphate. The temperature of the reacting substances should be maintained below about 100° C., while the preferred temperature is in the neighbourhood of 75° C. as hereinafter mentioned.

In carrying out the process the supplies of steam and gaseous ammonium may either be obtained from separate sources or the mixture of steam and ammonia may be generated together, as for example from an ammonia still, while when part of the water is required in the liquid condition it may be introduced as an aqueous solution of ammonia in a fine state of division produced by atomizing or spraying the said solution, this method of introduction of liquid water when the presence of such is desired being employed in conjunction with either of the methods above referred to for obtaining the ammonia steam mixture. The sulphur dioxide may be obtained by means of any of the usual methods, such as by burning sulphur, or pyrites or the material known as "spent oxide," or the gases produced in the roasting of ores containing sulphides may be used.

The reactions involved for the synthesis of ammonium sulphite and sulphate according to the present process may be set out as under:—

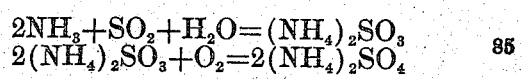

The relative proportions of the reacting substances employed are regulated so as to keep the temperature within the required limits, depending upon the degree of dilution of the reacting gases with air, so as to obtain a solid and substantially dry product consisting almost wholly of a mixture of ammonium sulphite and ammonium sulphate, while avoiding the formation of undesirable substances which render the product finally obtained unsuitable for use as a fertilizer. It is to be observed that the presence of air is necessary mainly for avoiding too high temperatures which would otherwise be attained owing to the heat of reaction, and for this purpose the concentration of sulphur dioxide should not exceed about 4.2 per cent of the whole volume of gas as previously mentioned but somewhat lower concentrations than this figure, for example 3.3 per cent of sulphur dioxide may also be used, while the quantity of ammonia employed is such as to give as small an excess as possible, for example an excess of 0.1 per cent above that required to combine with the sulphur dioxide. Further the steam should also be used in excess of that required for the reaction, a suitable quantity of steam being for example 1.2 to 1.4 times the amount theoretically required, but the quantity of steam used must be such as to be insufficient to make the reaction product sensibly wet after cooling. In conformity with what has just been stated, the proportions of ammonia gas and sulphur dioxide are preferably adjusted so that the gases issuing from the chamber or vessel in which the reaction is effected are substantially free from sulphur dioxide, the ammonia being maintained in the least possible excess. It is preferable to mix the sulphur dioxide with the air before introducing the ammonia (although as previously mentioned a part of the diluting air may if desired be introduced with the ammonia) and in order to avoid the addition of too great a quantity of air for diluent purposes the temperature in the reaction vessel near the point where the gases mix should be maintained at an appropriate value, preferably at about 75° C., though a certain amount of latitude on either side of this temperature is permissible so that the reaction indicated in the first of the above mentioned equations, which is reversible, does not proceed immediately to completion from left to right, but leads to a state of equilibrium between the gaseous phase and the separated solid. In order to obtain the highest possible yield of the solid product it is necessary to cool the mixture to a temperature at which the dissociation pressure of the ammonium sulphite becomes very small. This may be effected either by air or water-cooling the outside of the reaction vessel, or partially by the introduction of water in the liquid state as described above. The temperature to which the mixture must be cooled depends upon the proportions of the various reacting substances, and especially upon the quantity of surplus steam employed; in general however the mixture should be cooled to a temperature not exceeding 40° C. while it is preferred to cool the mixture where possible to a temperature in the neighborhood of 20° C. to 25° C. In all cases however the cooling must be regulated so that a sufficient quantity of the surplus steam to make the reaction product wet is not condensed.

The greater part of the solid product is precipitated within the reaction vessel employed in carrying out the process, but a certain remaining small proportion of it in the form of fume together with such very small quantities of sulphur dioxide and ammonia as remain uncombined will pass on with the issuing gases. In order to avoid loss of the product the exit gases from the reaction vessel may be subjected to the electro-static field of a Cottrell precipitator, or they may be passed through a suitable filter, or both these methods may be employed. Such a filter may consist of a layer of ammonium sulphate a few inches deep supported upon a perforated plate within a suitable container, mechanical means being provided for breaking up the film of finely divided solid product which is deposited upon the surface of the sulphate and which tends after some time to impede the passage of the gas.

After passing through a Cottrell precipitator and/or the filter, the gases may be passed through a scrubbing tower packed with suitable material such as coke, through which is circulated water, so as to dissolve any remaining ammonia, sulphur dioxide or ammonium sulphite. This solution may be circulated through the tower until its concentration with respect to ammonia and/or ammonium salts becomes sufficiently great for it to be treated conveniently in an ammonia still in order to recover the ammonia.

By adding a somewhat greater amount of water or water vapour to the gases during the reaction than the proportion theoretically necessary for the reaction itself, the solid product is prepared in such manner that the ammonium sulphite is in a state sensitive to rapid oxidation by the air. The oxidation of such sensitive material can be brought about comparatively rapidly by allowing it to stand in the air, and for this purpose the material may be arranged in heaps of suitable size and sufficiently large to avoid an over-rapid dissipation of the heat produced by the oxidation, the heaps being gently raked and turned over at suitable intervals so as gradually to expose to the air all parts of the whole mass of the material or the oxidation may conveniently be carried out with the aid of mechanical or other means arranged so as to secure the desired conditions. Under these conditions the material heats up quickly and may attain a temperature of over 100° C. in a quarter of an hour or less. The oxidation may thus be carried sufficiently far for commercial purposes in an hour or less, whereas the oxidation of ammonium sulphite prepared by other processes requires a number of days for completion.

It will be understood that where the ammonia is derived from gas-liquor, or similar crude ammonia containing liquors, it is necessary to purify the ammonia, before using it in the process, to the required extent necessary for preventing any detrimental effect arising from the presence of impurities on the preparation of the ammonium sulphite in a state sensitive to rapid oxidation by means of the process according to the present invention.

The product finally obtained, by the method hereinbefore described consists mainly of dry neutral ammonium sulphate in a form suitable for employment as a fertilizer.

What we claim and desire to secure by Letters Patent of the United States is:—

1. A process for the production of ammonium salts consisting mainly of ammonium sulphate and some ammonium sulphite which consists in admixing ammonia, water vapour, sulphur dioxide and air in such relative proportions that (a) the concentration of the sulphur dioxide does not exceed 4.2 per cent of the whole volume of the gases, (b) the ammonia is present in such quantity that the reaction mixture is non-acid, and (c) the amount of water vapour employed is sufficient to render the ammonium sulphite which is initially produced as a result of the reaction sensitive to rapid oxidation but is insufficient to make it sensibly wet after cooling the reaction products.

2. A process according to claim 1, in which the ammonia and water vapour are introduced into a gaseous mixture comprising sulphur dioxide and air.

3. A process according to claim 1, in which ammonia, water vapour and part of the air required is introduced into a gaseous mixture comprising sulphur dioxide and air.

4. A process according to claim 1, in which the reaction mixture is maintained slightly alkaline by employing a slight excess of ammonia.

5. A process according to claim 1, in which the temperature of the reacting substances is maintained at about 75° C.

6. A process according to claim 1, in which there is employed a quantity of steam amounting to 1.2 to 1.4 times that theoretically required for the reaction.

7. A process for the production of ammonium salts consisting mainly of ammonium sulphate and some ammonium sulphite which consists in admixing ammonia, water vapour, sulphur dioxide and air, maintaining the temperature of the reacting substances below about 100° C. and thereafter cooling down the mixture after the reaction has taken place to a temperature at which the dissociation pressure of ammonium sulphite is small, the various aforementioned substances being employed in such relative proportions that (a) the concentration of the sulphur dioxide does not exceed 4.2 per cent of the whole volume of the gases, (b) the ammonia is present in such quantity that the reaction mixture is non-acid, and (c) the amount of water vapour employed is sufficient to render the ammonium sulphate which is initially produced as a result of the reaction sensitive to rapid oxidation but is insufficient to make it sensibly wet after cooling the reaction products.

8. A process according to claim 7, in which the mixture is cooled down after the reaction has taken place to a temperature of 20° C. to 40° C.

9. A process according to claim 7, in which the ammonia and water vapour is introduced into a gaseous mixture comprising sulphur dioxide and air.

10. A process according to claim 7, in which ammonia, water vapour, and a part of the air required is introduced into a gaseous mixture comprising sulphur dioxide and air.

11. A process according to claim 7, in which the reaction mixture is maintained slightly alkaline by employing a slight excess of ammonia.

12. A process according to claim 7, in which there is employed a quantity of steam amounting to 1.2 to 1.4 times that theoretically required for the reaction.

13. A process for the production of ammonium salts consisting mainly of ammonium sulphate and some ammonium sulphite which consists in admixing ammonia, water vapour, sulphur dioxide and air, and oxidizing the ammonium sulphite initially produced as a result of the reaction to ammonium sulphate by exposing it to air, the various aforementioned substances being employed in such relative proportions that (a) the concentration of the sulphur dioxide does not exceed 4.2 per cent of the whole volume of the gases (b) the ammonia is present in such quantity that the reaction mixture is non-acid, and (c) the amount of water vapour employed is sufficient to render the ammonium sulphite which is initially produced as a result of the reaction sensitive to rapid oxidation but is insufficient to make it sensibly wet after cooling the reaction products.

14. A process for the production of ammonium salts consisting mainly of ammonium sulphate and some ammonium sulphite which consists in admixing ammonia, water vapour, sulphur dioxide and air, and oxidizing the ammonium sulphite initially produced as a result of the reaction to ammonium sulphate by gradually exposing it to air so as to avoid an over rapid dissipation of the heat produced by the reaction, the various aforementioned substances being employed in such relative proportions that (a) the concentration of the sulphur dioxide does not exceed 4.2 per cent of the whole volume of the gases, (b) the ammonia is present in such quantity that the reaction mixture is non-acid, and (c) the amount of water vapour employed is sufficient to render the ammonium sulphite which is initially produced as a result of the reaction sensitive to rapid oxidation but is insufficient to make it sensibly wet after cooling the reaction products.

15. A process according to claim 13, in which the ammonia and water vapour are introduced into a gaseous mixture comprising sulphur dioxide and air.

16. A process for the production of ammonium salts consisting mainly of ammonium sulphate and some ammonium sulphite which consists in introducing ammonia and water vapour into a gaseous mixture comprising sulphur dioxide and air, maintaining the temperature of the reacting substances at about 75° C., cooling down the mixture after the reaction has taken place to a temperature of 20° C. to 40° C., and oxidizing the ammonium sulphite initially produced as a result of the reaction to ammonium sulphate by exposing it to air, the various aforementioned substances being employed in such proportions that (a) the concentration of the sulphur dioxide does not exceed 4.2 per cent of the whole volume of the gases, (b) the ammonia is present in such quantity that the reaction mixture is non-acid, and (c) the amount of water vapour employed is sufficient to render the ammonium sulphite which is initially produced as a result of the reaction sensitive to rapid oxidation but is insufficient to make it sensibly wet after cooling the reaction products.

17. A process according to claim 16, in which the reaction mixture is maintained slightly alkaline by employing a slight excess of ammonia.

18. A process according to claim 16, in which the reaction mixture is maintained slightly alkaline by employing a slight excess of ammonia and the quantity of steam employed amounts to 1.2 to 1.4 times that theoretically required for the reaction.

JOHN HENRY WEST.
ARTHUR JAQUES.